United States Patent
Froeschle

[15] 3,663,949
[45] May 16, 1972

[54] CURRENT SENSING OF INDICATOR CURRENT IN SERIES WITH TRANSFORMER WINDING

[72] Inventor: Thomas A. Froeschle, Framingham, Mass.
[73] Assignee: Bose Corporation, Natick, Mass.
[22] Filed: Nov. 30, 1970
[21] Appl. No.: 93,529

Related U.S. Application Data

[63] Continuation-in-part of Ser. No. 869,520, Oct. 27, 1969.

[52] U.S. Cl. .................................323/17, 323/57, 323/DIG. 1
[51] Int. Cl. ..........................................................G05f 1/20
[58] Field of Search ..................323/6, 8, 9, 17, 22 T, 22 SC, 323/35, 36, 57, DIG. 1; 321/2

[56] References Cited

UNITED STATES PATENTS 3,461,377   8/1969   Reese...................................323/22 T Primary Examiner—Gerald Goldberg
Attorney—Charles Hieken

[57] ABSTRACT

In a two-state current-controlled system, a power switch is connected in series with the primary of a first transformer in series with an output inductor connected to the output terminal. The primary of a second transformer is connected in series with a diode connected to ground and the inductor. The secondaries of the first and second transformers are connected in series with respective controlled avalanche reset diodes that are connected to a current sensing resistance having its other end connected to ground so that the voltage across the current sensing resistance is representative of the current through the inductor.

5 Claims, 2 Drawing Figures

Patented May 16, 1972

3,663,949

THOMAS A. FROESCHLE
Inventor
By Charles Hieken
Attorney 3,663,949

CURRENT SENSING OF INDICATOR CURRENT IN SERIES WITH TRANSFORMER WINDING

REFERENCE TO PRIOR APPLICATION

This application is a continuation-in-part of application Ser. No. 869,520 filed Oct. 27, 1969, titled CURRENT CONTROLLED TWO-STATE MODULATION.

BACKGROUND OF THE INVENTION

The present invention relates in general to current sensing and more particularly concerns a novel current sensing system especially useful in current-controlled two-state circuits in which the duty cycle of a power switch is controlled to determine the power delivered to a load, usually at predetermined voltage. A feature of the invention is that it may provide a large output voltage without causing large losses in the power circuit.

Two-state circuits are characterized by high efficiency while affording a number of opportunities for effecting control. For the details on two-state circuitry and applications, reference is made to Bose U.S. Pat. No. 3,294,981 granted Dec. 27, 1966. Still additional advantages may be achieved with a current-controlled system in which the instants of switching of a power switch are controlled in accordance with a signal representative of the current delivered to the load. Such a system is applicable in a wide range of power conditioning systems with either direct or inverted output circuits while maintaining stable operation. Precise control over the currents in the power switch may be maintained at all times under all equilibrium, transient, overload and short circuit conditions while providing current limiting. Response to line and low voltage fluctuations occurs in a nearly time-optimal manner. Power conditioning systems with current control may be operated in parallel with controlled current sharing by the current controls associated with each system. For example, one system may supply three times the current of another system to a single load at a common voltage.

Not only does the typical current-controlled system control the voltage at the output, but it also controls the current. The basic current-controlled system comprises a voltage-actuated amplifier which provides a controlled (and limited) current to the load. The current flowing through the impedance of the load develops the output voltage that is regulated by providing a value of output current which, in conjunction with the load impedance, results in the desired output voltage. Under overload conditions, the output current rises to a controlled limit value, and then the output voltage varies depending on load conditions. Fundamentally, the system senses the current delivered to the load and controls the instants of switching of the power switch to maintain the current at a predetermined level.

Accordingly, it is an important object of this invention to provide a current sensing means for a two-state circuit. The term "two-state" as used herein embraces devices that may shift between two-levels, such as positive and negative, and perhaps reside briefly at another level, such as zero, in between.

It is another object of the invention to provide current sensing in accordance with the preceding object characterized by negligible power dissipation while providing an output voltage that is accurately representative of the current delivered to a load.

It is a further object of the invention to achieve one or more of the preceding objects with apparatus that is reliable and relatively inexpensive.

SUMMARY OF THE INVENTION

According to the invention, there is at least a first transformer means with magnetic core means having primary winding means in series with power switching means and inductive means in series with the load. The first transformer means also includes secondary winding means in series with a controlled avalanche unilaterally conducting device in series with a current sensing resistance and poled to provide a low impedance path for current flow from said secondary winding means when said power switch means is closed while presenting a relatively high impedance to the current flow which occurs when said power switch means is open. Preferably there is also second transformer means with magnetic core means having a primary winding means in series with the inductive means and a unilaterally conducting device poled to permit the flow of current that occurs through the inductive means when said power switch means is open. The second transformer means also includes the secondary winding means in series with an avalanching unilaterally conducting device in series with the current sensing resistive means and poled for the easy flow of current when said power switch means is off. The feature of this preferred arrangement is that the first transformer means and avalanching diode means provides a current representative of inductive means current increasing while the second transformer means and associated circuitry provides current to the current sensing resistive means representative of the inductive means current decreasing to provide a signal representative of the complete current waveform. An advantage of the avalanching diodes is that they develop enough voltage in the reversed-biased condition across associated secondary winding means to reset the associated transformer magnetic core means.

Numerous other features, objects, and advantages of the invention will become apparent from the following specification when read in connection with the accompanying drawing in which:

DETAILED DESCRIPTION OF PREFERRED EMBODIMENTS

Figure 1:
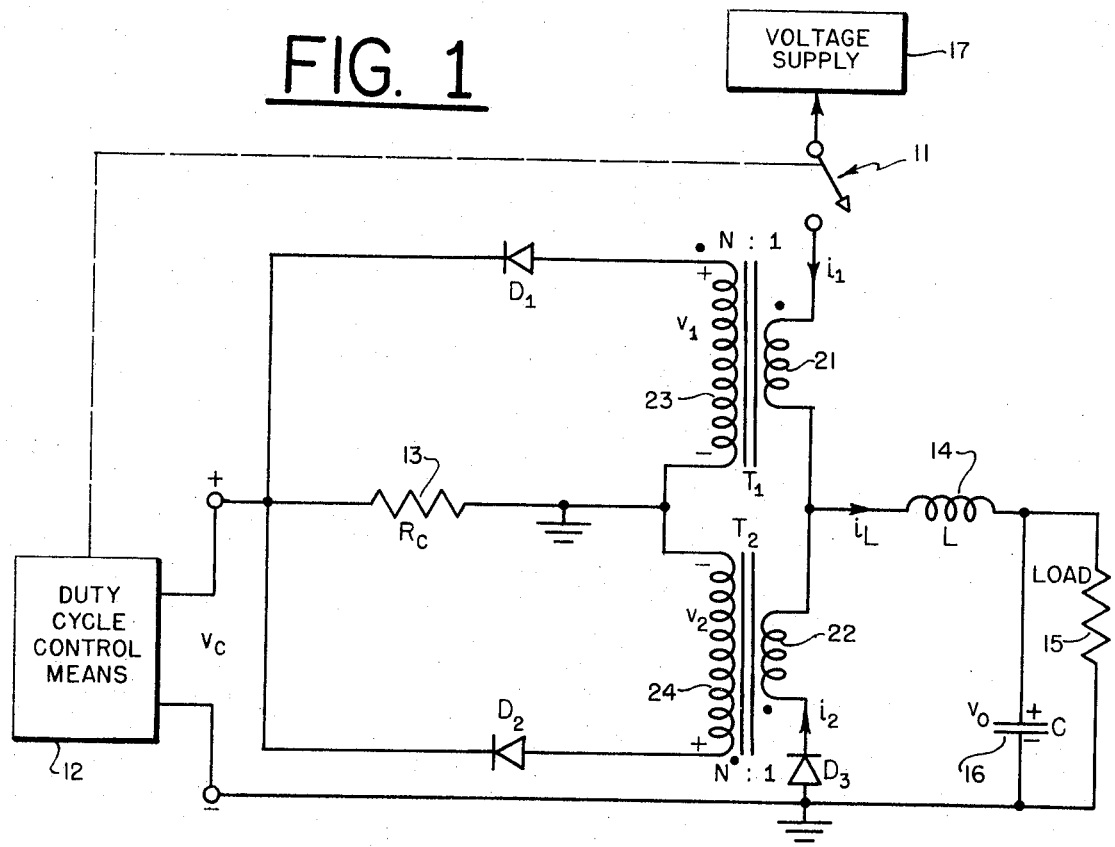
FIG. 1 is a schematic circuit diagram of an exemplary embodiment of the invention.

With reference now to the drawing and more particularly FIG. 1 thereof, there is shown a combined block-schematic-circuit diagram of an exemplary embodiment of the invention. A power switch 11 opens and closes in response to a duty cycle control signal provided by a duty cycle control means 12 which receives a voltage $v_c$ representative of the current flowing through resistor 13 of value $R_c$ corresponding to the current waveform $i_L$ that flows through the inductor 14 of value L to control the current delivered to load 15 shunted by capacitor 16 of value C, the electrical energy being delivered from voltage supply 17. The duty cycle control means 12, voltage supply 17, power switch 11, inductor 14, load 15 and capacitor 16 are not a part of this invention and are illustrated for showing the background in which the invention performs. Power switch 11 may be mechanical, electromechanical, fluidic, a transistor, a controlled rectifier, or any of other numerous switching devices. Duty cycle control means 12 may also include a source of a reference voltage or other control signals that help determine the instants of time when power switch 11 opens and closes. Examples of such duty cycle control means are set forth in the aforesaid Bose copending application and U.S. patent and will not be described further here so as to avoid obscuring the principles of the invention.

The circuit of FIG. 1 also includes a first transformer $T_1$ and a second transformer $T_2$ having primary windings 21 and 22, respectively, and secondary windings 23 and 24, respectively. The windings are poled as indicated by the dots. Primary winding 21 is in series with inductor 14 and delivers current to inductor 14 when power switch 11 is closed. Primary winding 22 is in series with diode $D_3$ poled as shown having its anode connected to ground for delivering current to inductor 14 when power switch 11 is open.

Secondary windings 23 and 24 are in series with their junction connected to ground. Avalanching diodes $D_1$ and $D_2$ are connected between the other ends of secondary windings 23 and 24, respectively, and current sensing resistance 13 so that the voltage between their junction with resistor 13 and ground is representative of the current $i_L$.

Having described the physical arrangement, the mode of operation will be discussed. Transformer current sensing as illustrated is especially useful when the power switch 12 opens and closes without interruption. Then, the voltage $v_c$ across resistor 13 is accurately representative of both DC and AC components of the current $i_L$.

When power switch 11 closes, current flows from voltage supply 17 through switch 11, primary winding 21 and inductor 14 to the output. Secondary winding 23 then reflects a current $i_1$ that flows easily through avalanching diode $D_1$ and current sensing resistance 13 to produce a voltage $$v_c = i_1 R_c/N \qquad (1)$$

where $N$ is the ratio of secondary winding turns to primary winding turns. While power switch 11 is closed, $i_1 = i_L$. When power switch 11 opens, the current through inductor 14 does not change instaneously but is then received through power diode $D_3$ and primary winding 22 so that $i_L = i_2$. Then transformer $T_2$ reflects a current to secondary winding 24 producing a sensing voltage $v_c$ across resistor 13:

$$v_c = i_2 R_c/N \qquad (2)$$

where $N$ is the turns ratio of secondary winding turns to primary winding turns.

When power switch 11 is opened, $i_1 = 0$ and when power switch 11 is closed, $i_2 = 0$.

In general, $$i_1(t) = i_2(t) = i_L(t) \qquad (3)$$

From equations (1), (2) and (3), $$v_c = i_L R_c/N \qquad (4)$$

Thus, the voltage $v_c$ is directly proportional to the current $i_L$ through inductor 14.

A feature of the invention is that it provides a relatively large output voltage with negligible power circuit loses. For example, when $R_c = 100$ ohms, $N = 100$ and $i_L = 1$ amp., the sensing voltage $v_c = 1$ volt, more than adequate for a control junction. However, under these conditions, the primary voltage is only $v_c/N$, or 0.01 volt so that the sensing circuit only dissipates $P = i_L \times v_c/100$, or 10 milliwatts, a negligible amount.

An important feature of the invention is self-reset operation produced by the means including the avalanche reset diodes $D_1$ and $D_2$. Diodes $D_1$ and $D_2$ permit large reset voltage pulses occur across the transformer windings when the current in the primary of an associated transformer first returns to zero. A sudden change in the current through the inductances associated with the transformers produce reset voltage pulses tending to oppose such changes. The area of these reset voltage pulses is of opposite polarity to that of the sensing voltage (and avalanching diode voltage) during the time the transformers pass current. These reset pulses cause the average voltage across the transformer windings to be zero and thereby prevent the buildup of DC current flow in the inductances associated with the transformers.

Figure 2:
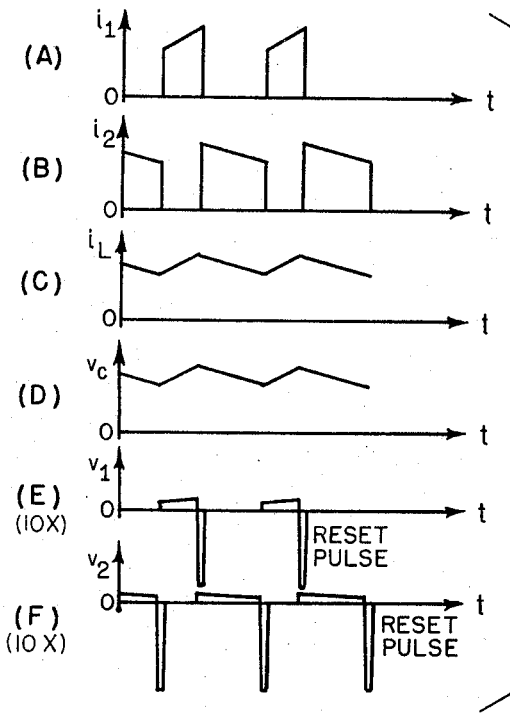
FIG. 2 is a graphical representation of signal waveforms plotted to a common time scale helpful in understanding the principles of operation of the circuit of FIG. 1.

Referring to FIG. 2, there is shown a graphical representation of signal waveforms plotted to a common time scale helpful in understanding the mode of operation of the circuit of FIG. 1. Waveforms (A) and (B) are the current waveforms $i_1$ and $i_2$, respectively, through primary windings 21 and 22, respectively. Waveform (C) is the sum of these current waveforms and is the current waveform $i_L$ through inductor 14. Waveform (D) is the voltage $v_c$ across current sensing resistance 13.

Waveforms E and F are graphical representations of the voltages $v_1$ and $v_2$ across transformer primary 23 and 24, respectively, scaled by a factor of 10 over the magnitude of voltage $v_c$ illustrated in waveform D. These reset pulses are large in amplitude and short in duration. During the time that one of the transformers is passing current, a small magnetizing current is developed as $$I_m = 1/L_m \int v_r(t') dt' \qquad (5)$$

where $L_m$ is the magnetizing inductance of the transformers. When the main current flowing in the transformer is interrupted by a change in the state of power switch 11, only the current $I_m$ in the magnetizing inductance remains. This current flows through one of the reset diodes $D_1$ and $D_2$ in the reverse direction causing the diode to avalanche. By selecting these diodes to avalanche at high voltages, a large negative voltage appears across the transformer winding. This high voltage rapidly resets the magnetizing current to zero to terminate current flow through the associated reset diode. Therefore, this diode recovers from the avalanche condition with the voltage across it returning to zero. The transformer is now completely reset and ready to operate on the next current pulse.

The invention has been found to operate very satisfactorily. It provides high gain, low RFI (radio high frequency interference), and high input/output isolation. Miniature ferrite pot cores worked well in this application with a single-turn primary and 100-turn secondary. Diodes $D_1$ and $D_2$ were type UTR–60 avalanching diodes having an avalanche voltage of approximately 600 volts. Diode $D_3$ was a type 1N3879 diode.

There has been described novel transformer current sensing apparatus characterized by high gain, reliable operation, high linearity, low RFI and low power dissipation. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for sensing the current through an inductor comprising,
   at least first transformer means having primary winding means and a secondary winding means intercoupled by means including a ferromagnetic core,
   means for connecting said primary winding means in series with said inductor so that the same current that flows through said primary winding means also flows through said inductor,
   current sensing resistive means for providing a voltage thereacross representative of the current through said inductor,
   a first unilaterally conducting device,
   and means for connecting said current sensing resistive means and said unilaterally conducting device in series with said secondary winding means.

2. Current sensing apparatus in accordance with claim 1 and further comprising,
   a second transformer means having primary winding means coupled to secondary winding means by means including a magnetic core,
   a second unilaterally conducting device,
   means for connecting the second transformer means primary winding means in series with said inductor,
   and means for connecting said second unilaterally conducting device in series with the second transformer secondary winding means and said current sensing resistive means,
   whereby the voltage across said current sensing resistive means is proportional to the sum of the currents in the first and second transformer primary winding means.

3. Current sensing apparatus in accordance with claim 2 and further comprising,
   a third unilaterally conducting device in series with said second transformer means primary winding means,
   a source of electrical energy,
   switching means in series with said electrical energy source and said first transformer means primary winding means for providing and interrupting current through the latter primary winding means when said switching means is closed and open respectively, said third unilaterally conducting means being poled to allow easy flow of current therethrough to said inductor substantially only when said switching means is open, whereby said first transformer primary winding means carries said inductor current when said switching means is closed and said second transformer primary winding means carries said inductor current when said switching means is open.

4. Current sensing apparatus in accordance with claim 3 wherein said first and second unilaterally conducting devices are poled to carry current in the easy flow direction when the primary winding of the associated transformer means carries current.

5. Apparatus in accordance with claim 4 wherein said first and second diode means are avalanching diodes having an avalanching voltage high enough to develop a voltage across the associated secondary winding means sufficiently high to permit reset of the associated magnetic core during the time interval shortly after current stops flowing in the associated primary winding means.

* * * * *